Jan. 8, 1924.
1,479,812
J. W. HOLT
PAPER TUBE MAKING MACHINE
Filed Sept. 23, 1921   2 Sheets-Sheet 1
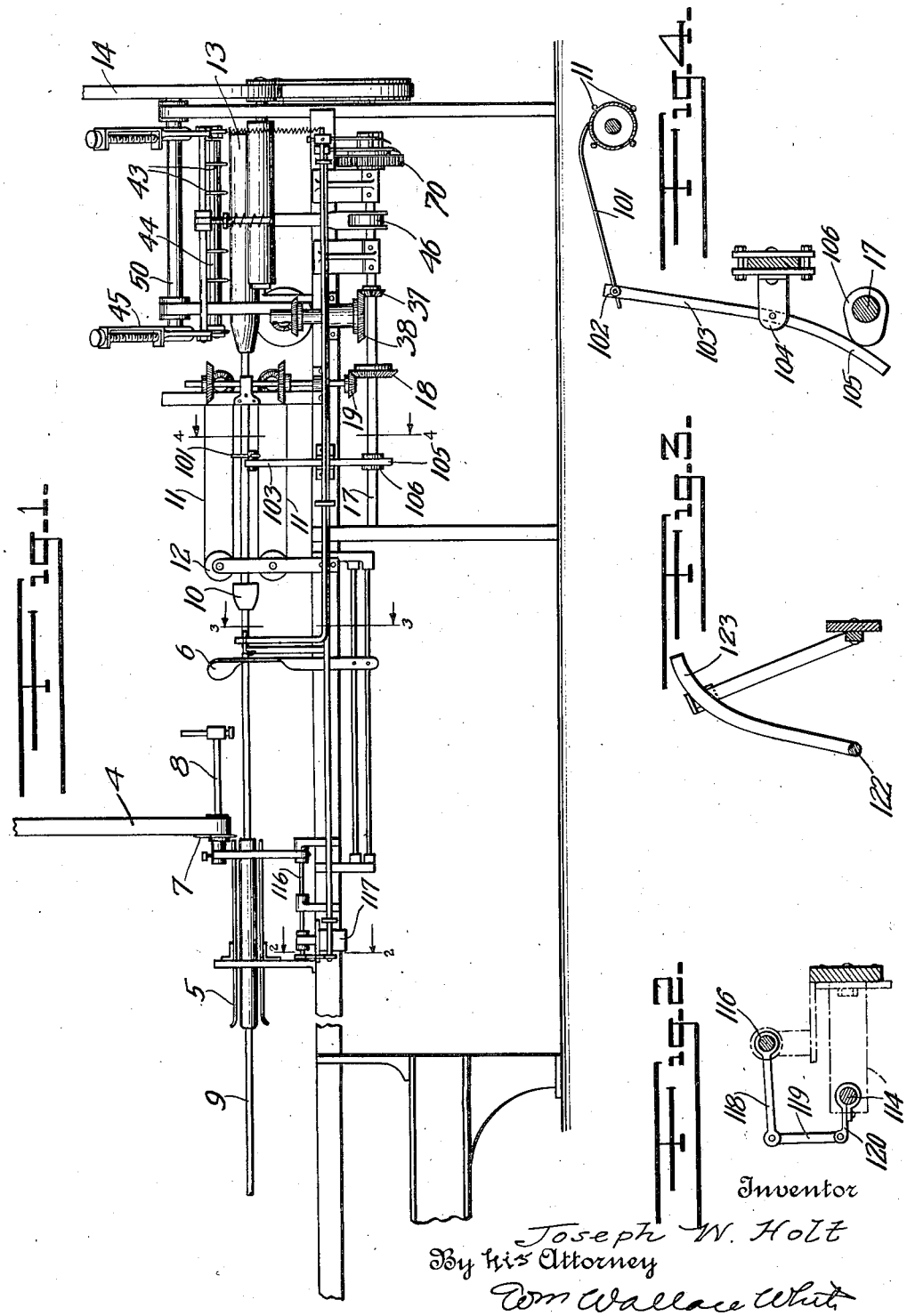
Inventor
Joseph W. Holt
By his Attorney
Tom Wallace White

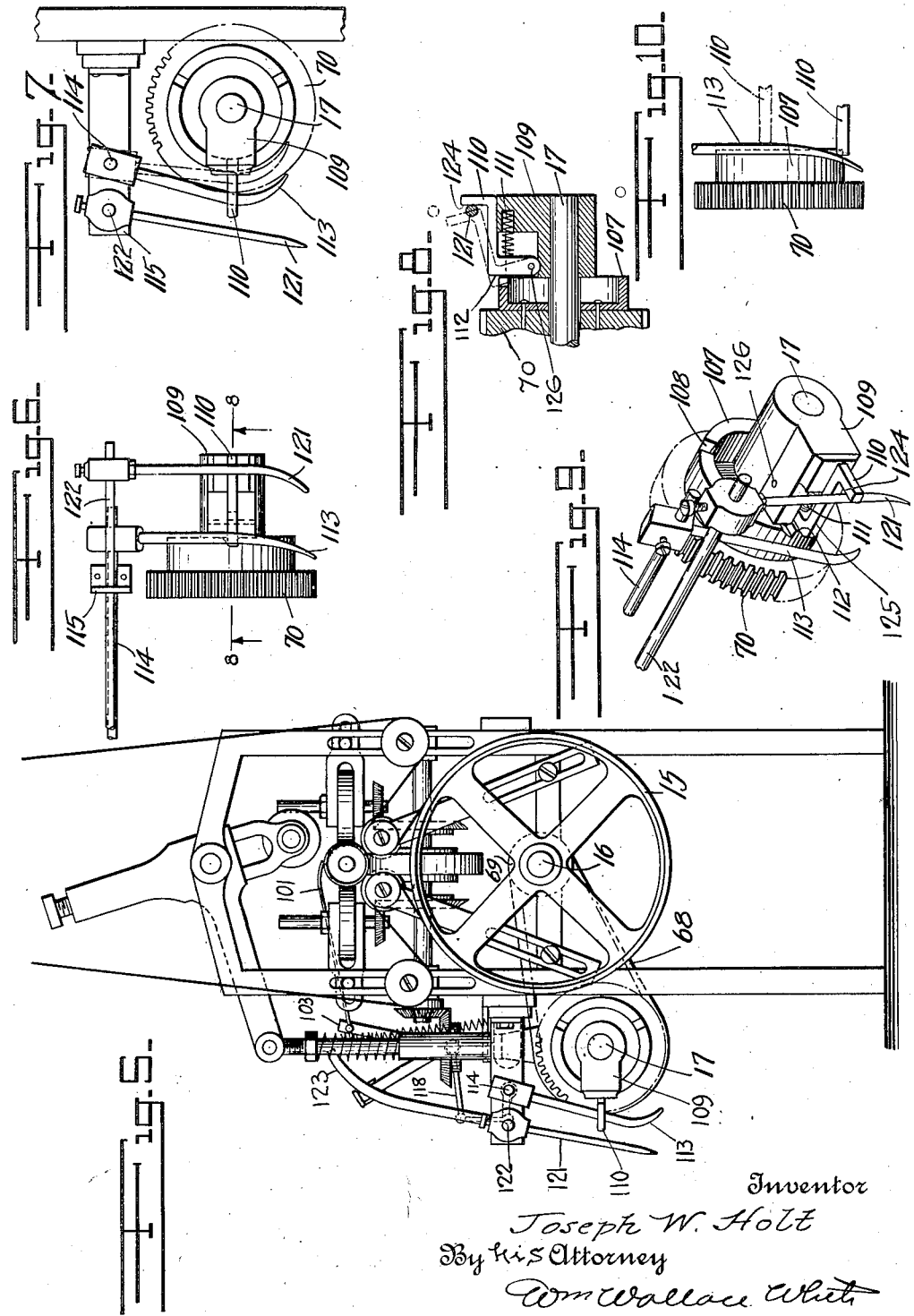

Patented Jan. 8, 1924.

1,479,812

UNITED STATES PATENT OFFICE.

JOSEPH W. HOLT, OF BROOKLYN, NEW YORK, ASSIGNOR TO UNION PAPER COMPANY, OF NEW YORK, N. Y., A CORPORATION OF NEW YORK.

PAPER-TUBE-MAKING MACHINE.

Application filed September 23, 1921. Serial No. 502,609.

*To all whom it may concern:*

Be it known that I, JOSEPH W. HOLT, a citizen of the United States of America, residing at Brooklyn, in the county of Kings and State of New York, have invented new and useful Improvements in Paper-Tube-Making Machines, of which the following is a specification.

This invention relates to machinery for making paper tubes and like articles, and particularly to a machine of the kind described in my co-pending application Serial No. 404,066, in which the complete operation of making and forming paper tubes and cutting them to finished size, is automatically performed.

The object of the present invention is to provide certain improvements on the apparatus described in my said co-pending application, these improvements having to do particularly with mechanism for controlling and insuring correspondence between the cutting of the tubes into finished sections and the rate at which the tube is formed and the rough portions cut off therefrom. In the machine as described in my said co-pending application, the mechanism for forming the tubes was operated continuously, and the mechanism for cutting the tubes into finished lengths was also operated continuously, the proportionate rates of operation of these parts being such as to enable the cutting mechanism to perform its complete cycle of operation during the time that the tube-forming mechanism normally required to complete the formation of the length of tube acted upon in the cutting mechanism. While this construction functions substantially as described, it has been found that the rate of formation of the tube varies appreciably from a uniform rate, as there is more or less slippage between the belt and the tube, as it is wound upon the mandrel, and also there is, of course, more or less slippage in the belting driving the machinery and the different parts thereof. The result of this irregularity in the rate of formation of the tube is that, at times, the tube is formed faster than the cut off portions can be taken care of by the mechanism for cutting to finished sizes, and at other times, after a tube portion has been cut to finished size, another portion is not ready to push off the finished pieces before the knives again come into action against the roller, so that if any of the finished lengths of tube have shifted along the roller, as is likely to be the case, these are damaged and rendered useless by the operation of the knives upon them a second time.

Accordingly the present invention provides means for insuring that the cutting mechanism shall come into operation once every time a tube portion is formed and cut off in the rough. My invention also has for its object the further control of the movement of the cut off tube portions during their passage from the forming apparatus to the finishing cutting apparatus. A further object of the invention is to provide a hand control for bringing the cutting apparatus into operation as desired, and for preventing the cutting apparatus from operating while the machine is being started up, and until the tube is being properly formed and glued.

My invention consists in the construction, combination and arrangement of parts herein described and claimed, and illustrated in the accompanying drawings.

In these drawings, in which I have shown a preferred embodiment of my invention, and in which similar reference characters designate corresponding parts in all views, Figure 1 is a side elevation of part of a tube-forming and cutting machine embodying the invention, showing particularly the cutting mechanism, and omitting the forming mechanism, which may be of usual construction;

Fig. 2 is a detail sectional view taken approximately on the line 2—2 of Fig. 1;

Fig. 3 is a sectional detail taken approximately on the line 3—3 of Fig. 1;

Fig. 4 is a sectional detail of the braking mechanism taken approximately on the line 4—4 of Fig. 1;

Fig. 5 is a view looking at the machine from the right-hand end of Fig. 1;

Fig. 6 is a detail on an enlarged scale, of a portion of Fig. 1, showing the clutch and operating mechanism;

Fig. 7 is an end view of the detail shown in Fig. 6;

Fig. 8 is a sectional detail taken approximately on the line 8—8 of Fig. 6;

Fig. 9 is an isometric view of the parts shown in Figs. 6, 7 and 8; and

Fig. 10 is a detail of the clutch mechanism.

Referring to the drawings, the machine illustrated is the same in its fundamental construction as that illustrated in my said co-pending application, and the same reference characters are used that were used in connection with the same parts in said application.

The tube formed in the usual manner, as it is advanced, is received by guides 5 and advances until the end of it strikes against a lever 6 which operates in the usual manner to bring the saw wheel 7, having saw teeth on its edge and driven by a belt 4, against the tube to cut it off. The saw 7 is brought into operation in the usual manner by oscillation of the shaft 116, which is usually effected by a compressed air plunger diagrammatically illustrated at 117 acting upon a lever attached to the shaft 116. Since the tube is rotating and advancing, the saw 7 must be allowed to travel along with the tube until it is cut off, the saw being slidably mounted on a rod 8. This is the usual arrangement and results in the tube being roughly cut into portions of approximately uniform size.

As soon as a portion is cut off, it drops from the end of the guides 5, thus releasing the lever 6 and permitting the saw 7 to be swung out of the way, and returned to initial position, in the usual manner.

The cut off portions of tube as they drop are received upon a rod 9 fixed to the end of the mandrel, and are pushed along the rod 9 by the oncoming tube advancing from the mandrel. The forward end of the cut off portion engages a conical guiding piece 10 which serves to lift the portion off the rod so that it can be engaged by conveying mechanism comprising preferably a number of belts 11 arranged to travel parallel to the rod 9 and supported upon wheels 12 arranged to be driven by suitable mechanism at a speed such that when the tube portion is grasped by the belt, it is dragged rapidly forward at a rate much greater than the rate at which the tube-forming mechanism advances the tube.

This conveying mechanism carries the tube portion forward on to a roller 13 which is mounted, preferably with the use of ball-bearings, in line with and preferably directly upon the rod 9.

The power for operating the conveying and cutting mechanism may be supplied from a suitable source, preferably the same as that supplying the tube-forming mechanism, through a belt 14 arranged to rotate a pulley 15 mounted upon and adapted to rotate a shaft 16 from which power may be transmitted to a countershaft 17 by means of a sprocket chain 68 and sprocket wheels 69 and 70 mounted upon the shaft and countershaft respectively, the wheel 70 being revoluble on the countershaft 17; and a suitable framework is provided for supporting these mechanisms.

The mechanism for driving the belts 11 of the conveyor is preferably operated from the countershaft 17 through the bevel gears 18, 19, as described in my said co-pending application. Associated with these belts I prefer to provide mechanism to retard the tube lengths or portions momentarily, until that portion of the cycle of the finishing cutting mechanism, when it is time to remove the preceding tube portion, cut to finished lengths, from the roller 13, so that each tube portion will be advanced on to the roller 13 with substantially the same force and speed. This mechanism comprises the rod 101 adjustably mounted preferably by means of a thumb screw 102 upon a lever 103 pivoted as at 104 to the frame of the machine, and having a lower portion 105 arranged to be actuated by a cam 106 mounted on the shaft 17 so as to cause this arm 101 to frictionally engage a tube section and hold it against further advancing movement during a portion of the cycle of the cutting mechanism, which is determined by the setting of the cam with respect to the shaft 17 and the other cams operated therefrom.

The mechanism for rotating the cut-off portion of the tube after it has been forwarded by the conveying mechanism and advanced upon the roller 13, is operated continuously from the belt 14 as described in my said co-pending application.

The feeding of tube portions from the conveying belts 11 on to the roller 13, is effected as described in my said co-pending application by mechanism operated from the countershaft 17, through the bevel gears 37, 38.

The mechanism for cutting the tube portions to finished sizes consists preferably of a plurality of disc knives 43 mounted upon a shaft 44 carried in arms 45 pivotally mounted on a shaft 50 and arranged to be brought into contact with the roller 13, or thrown out of contact therewith, by the operation of a cam 46 mounted upon the countershaft 17.

The mechanism for forming the tubes operates continuously, and thus brings into action each time a given length of tube is formed the mechanism associated with the saw 7 for cutting the tube as formed into roughly cut off portions. The mechanisms for advancing the tubes, and cutting the tube sections into finished sizes, are operated from the countershaft 17. It is desirable that all the mechanisms driven from the countershaft 17 shall complete one cycle of operation for every rough tube portion that is cut off; consequently I have provided mechanism associated with the shaft 17 for bringing this shaft into operation to complete one revolution each time a tube portion is cut off by the saw 7. This mechanism may comprise the sprocket wheel 20 which is revolubly mounted upon the shaft 17, and carries with it a clutch member 107 provided with one or more notches 108. Keyed to the shaft 17 there is provided a clutch member 109 carrying a lever 110 pivoted at 126 and normally urged by a spring 111 into engagement with one of the notches 108, so as to cause rotation of the shaft 17 with the sprocket wheel 20.

The lever 110 is provided with a cam surface 112, adapted to come into contact with a cam member 113 at a particular part of the revolution of the shaft 17, when the cam member is thrown into operative position, to throw the lever 110 out of engagement with the notch 108, thus stopping rotation of the shaft 17. The cam member 113 is set to stop the shaft 17 in a position such that the knives 43 are out of engagement with the roller 13.

The cam 113 is preferably mounted upon a shaft 114 which may be oscillated to throw the cam into and out of operative position, and which is supported in suitable bearings 115 upon the side of the frame of the machine, extending lengthwise to the mechanism for actuating the saw 7, its connection therewith being shown in detail in Fig. 2. To the shaft 116 for operating the saw 7 there is clamped a lever 118 connected by a link 119 with a lever 120 mounted upon the shaft 114, so that when the shaft 116 is oscillated to bring into action the saw 7 to cut off a tube portion, the shaft 114 is simultaneously oscillated to draw the cam 113 out of contact with the surface 112 of the lever 110, permitting the lever 110 to engage one of the notches 108 of the rotating clutch member 107, and thus to bring about the rotation of the shaft 17. When the tube portion has been cut off, the mechanism actuating the saw 7 permits it to return ready for another similar operation, and the returning of the shaft 116 to normal position, permits the shaft 114 likewise to return to normal position, and the cam 113 to be thrown into position to engage the cam surface 112 so as to throw the lever 110 out of contact with the notch 108 the next time the shaft comes around into that position, thus stopping the rotation of the shaft 17. If, however, at this moment, or prior thereto, another tube portion is cut off, this will cause the cam 113 to be again thrown out of the way of the surface 112, and consequently when the tubes are being made at the full capacity of the forming mechanism, with slippage cut down to a minimum, the operation of the cutting mechanism will likewise be maintained continuous, by reason of the fact that a tube portion will be cut off at the moment the lever 110 is approaching the cam 113, and the cam 113 is thus thrown out of the way and does not strike the cam surface 112. If, however, for any reason a revolution of the shaft 17 is completed in less time than is required for the formation and cutting off of a tube portion, the clutch will be thrown out from time to time so as to give the forming mechanism an opportunity to produce tube portions at the same rate that the portions are being cut to finished size.

At the time that the mechanism, as a whole is being started up, the first few tube sections produced are not likely to be glued together sufficiently to make perfect finished pieces, and consequently the operator tears these off the machine as they are cut by the saw 7. It is therefore desirable that the operator shall be able to control the cutting mechanism, and consequently an additional cam 121 may be mounted upon a shaft 122 provided with a handle portion 123 located conveniently to the operator. The cam 121 preferably operates upon another cam surface 124 of the lever 110 in the same manner as the cam 113.

While the operation has been indicated in the foregoing description, it may be summarized as follows, reference being had particularly to Figs. 6 to 10 of the drawings: Assuming that the machine is operating, each time a tube portion is cut off the cam 113 is drawn from the dotted position, Fig. 7, out of the path of the lever 110 to the full lined position of Figs. 7 and 9, so that the lever 110, urged by the spring 111 engages the next notch 108 of the clutch 107, causing the shaft 17 to rotate with the wheel 70, such rotation continues for a revolution, and then either continues further or ceases dependent upon the operation of the cam 113. If the revolution is completed before another tube portion is cut off, the cam 113 remains in the position shown in Fig. 10, and the lever 110 sliding upon the cam 113 from the full line position shown to the dot and dash position shown, is disengaged from the notch 108, allowing the wheel 70 to continue to rotate, but leaving the shaft 17 stationary. When another tube portion is cut, the cam 113 is thrown out, the lever 110 is moved by the spring 111 against the clutch 70, and is caught by the next notch 108. The surface 125 of the lever ensures that the cam 113 shall not reengage the lever 110, should the cutting off of the portion be complete before the notch 108 is engaged.

As indicated, the cam 121 cooperates with the surface 124 of the lever 110 in the same manner to disengage the clutch when the shaft 122 is oscillated by hand on the arm 123, at the will of the operator.

In order to insure uniformity in the advancing of tube portions on to the roller 13, the cam 106 is set to cause the arm 101 to retard the advancing tube portion until the preceding portion has been cut to finished size and the knives 43 withdrawn, and then release the advancing tube portion, so that each portion thus passes on to the roller 13 at identically the same part of the cycle of operation of the finishing cutting mechanism.

Having now described my invention, I claim and desire to secure by Letters Patent:

1. In a paper tube making machine, the combination comprising mechanism for cutting off portions of the tube as formed, mechanism for cutting said portions to finished size, and mechanism actuated by said cutting off mechanism for causing the finishing cutting mechanism to operate through one cycle each time a tube portion is cut off.

2. In a paper tube making machine, the combination comprising mechanism for cutting off portions of the tube as formed, mechanism for cutting said portions to finished size, a source of power, a clutch interposed between said latter mechanism and said source of power, and means actuated by the said cutting off mechanism for causing engagement of said clutch.

3. In a paper tube making machine, the combination comprising mechanism for cutting off portions of the tube as formed, mechanism for cutting said portions to finished size, a clutch to control the operation of said latter mechanism, a cam member arranged to control the engagement of said clutch, and means actuated by the said cutting off mechanism for operating said cam member.

4. In a paper tube making machine, the combination comprising mechanism for cutting off portions of the tube as formed, mechanism for cutting said portions to finished size, a clutch to control the operation of said latter mechanism, a cam member arranged to control the engagement of said clutch, a rod upon which said cam member is mounted, and means actuated by said cutting off mechanism for oscillating said rod to move said cam member into and out of operative position.

5. In a paper tube making machine, the combination comprising mechanism for cutting off portions of the tube as formed, mechanism for cutting said portions to finished size, a shaft from which said finishing cutting mechanism is driven, a driven wheel revolubly mounted on said shaft, a clutch member associated with said wheel, a clutch member mounted on said shaft, and mechanism for causing engagement of said clutch members on the cutting off of a tube portion.

6. In a paper tube making machine, the combination comprising mechanism for cutting off portions of the tube as formed, mechanism for cutting said portions to finished size, a shaft from which said finishing cutting mechanism is driven, a driven wheel revolubly mounted on said shaft, a clutch member associated with said wheel, a clutch member mounted on said shaft, a movable member mounted on the clutch member of the shaft and provided with a cam surface, a spring disposed to urge said member into engagement with the clutch member of the wheel, and a cam arranged to act on said cam surface as the shaft rotates to withdraw said movable member from engagement with the clutch member associated with the driven wheel, thereby stopping rotation of the shaft.

7. In a paper tube making machine, the combination comprising mechanism for cutting off portions of the tube as formed, mechanism for cutting said portions to finished size, a shaft from which said finishing cutting mechanism is driven, a driven wheel revolubly mounted on said shaft, a clutch member associated with said wheel, a clutch member mounted on said shaft, a movable member mounted on the clutch member of the shaft and provided with a cam surface, a spring disposed to urge said member into engagement with the clutch member of the wheel, a cam arranged to act on said cam surface as the shaft rotates to withdraw said movable member from engagement with the clutch member associated with the driven wheel, thereby stopping rotation of the shaft, and means for throwing said cam out of engagement with said cam surface to permit engagement of the clutch.

8. In a paper tube making machine, the combination comprising mechanism for cutting off portions of the tube as formed, mechanism for cutting said portions to finished size, a shaft from which said finishing cutting mechanism is driven, a driven wheel revolubly mounted on said shaft, a clutch member associated with said wheel, a clutch member mounted on said shaft, a movable member mounted on the clutch member of the shaft and provided with a cam surface, a spring disposed to urge said member into engagement with the clutch member of the wheel, a cam arranged to act on said cam surface as the shaft rotates to withdraw said movable member from engagement with the clutch member associated with the driven wheel, thereby stopping rotation of the shaft, and means actuated by said cutting off mechanism for throwing said cam out of engagement with said cam surface to permit engagement of the clutch.

9. In a paper tube making machine, the combination comprising mechanism for cutting off portions of the tube as formed, mechanism for cutting said portions to finished size, a shaft from which said finishing cutting mechanism is driven, a driven wheel revolubly mounted on said shaft, a clutch member associated with said wheel, a clutch member mounted on said shaft, a movable member mounted on the clutch member of the shaft and provided with a cam surface, a spring disposed to urge said member into engagement with the clutch member of the wheel, a cam arranged to act on said cam surface as the shaft rotates to withdraw said movable member from engagement with the clutch member associated with the driven wheel, thereby stopping rotation of the shaft, means actuated by said cutting off mechanism for throwing said cam out of engagement with said cam surface to permit engagement of the clutch and supplemental means for disengaging said clutch at will.

10. In a paper tube making machine, the combination comprising mechanism for cutting off portions of the tube as formed, mechanism for cutting said portions to finished size, mechanism for advancing cut off portions to the finishing cutting mechanism, mechanism for causing the finishing cutting mechanism to operate through one cycle each time a tube portion is cut off, and means to retard the advancing of a tube portion until a predetermined point of the cycle of the finishing cutting mechanism.

11. In a paper tube making machine, the combination comprising mechanism for cutting off portions of the tube as formed, mechanism for cutting said portions to finished size, mechanism for advancing cut off portions to the finishing cutting mechanism, means to retard the advancing of a tube portion until a predetermined point of the cycle of the finishing cutting mechanism, and mechanism for causing the finishing cutting mechanism and the retarding mechanism to operate through one cycle each time a tube portion is cut off.

12. In a paper tube making machine, the combination comprising mechanism for cutting off portions of the tube as formed, mechanism for cutting said portions to finished size, mechanism for advancing cut off portions to the finishing cutting mechanism, means for frictionally engaging a tube portion being actuated on by the advancing mechanism to stop its advance, and mechanism for causing the finishing cutting mechanism to operate through one cycle each time a tube portion is cut off, and said means to engage a tube portion at a predetermined point of said cycle.

13. In a paper tube making machine, the combination comprising mechanism for cutting off portions of the tube as formed, mechanism for cutting said portions to finished size, mechanism for advancing cut off portions to the finishing cutting mechanism, a shaft from which said finishing cutting mechanism is driven, a driven wheel revolubly mounted on said shaft, a clutch member associated with said wheel, a clutch member mounted on said shaft, means for retarding the advance of a tube portion, a cam on said shaft for actuating said means, and mechanism for causing engagement of said clutch members on the cutting off of a tube portion.

In testimony whereof I have signed my name to this specification.

JOSEPH W. HOLT.